No. 668,447. Patented Feb. 19, 1901.
A. KREIDT.
LEVERAGE POWER MECHANISM.
(Application filed Nov. 13, 1900.)
(No Model.)
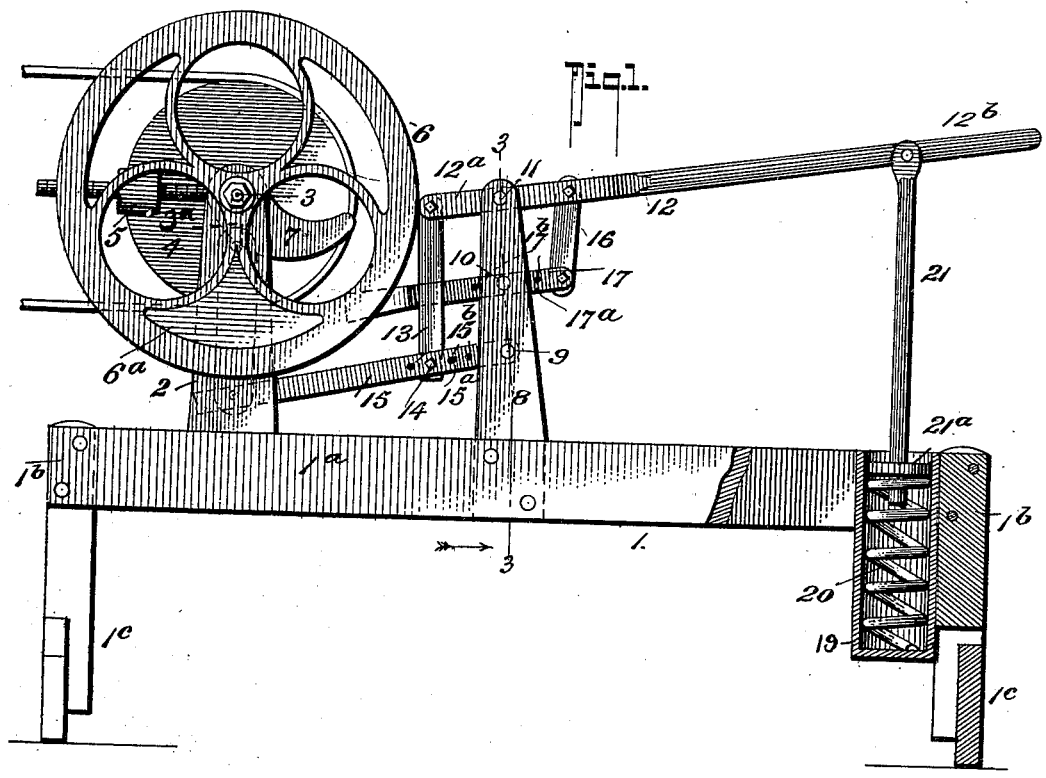
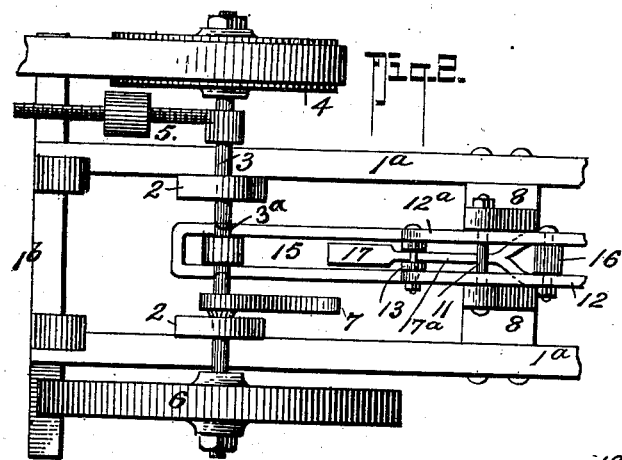
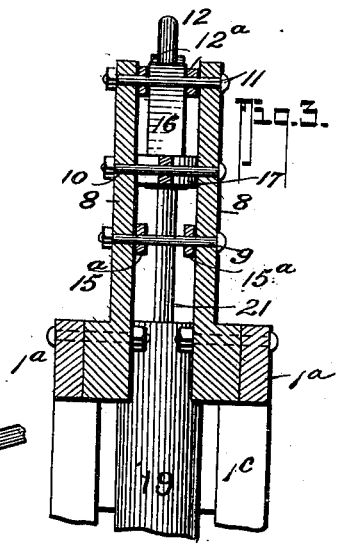
WITNESSES:
Louis Dieterich
L. Hentzell
INVENTOR
August Kreidt
BY
Fred G. Dieterich & Co.
ATTORNEYS

UNITED STATES PATENT OFFICE.

AUGUST KREIDT, OF INDIANOLA, NEBRASKA.

LEVERAGE-POWER MECHANISM.

SPECIFICATION forming part of Letters Patent No. 668,447, dated February 19, 1901.

Application filed November 13, 1900. Serial No. 36,377. (No model.)

*To all whom it may concern:*

Be it known that I, AUGUST KREIDT, residing at Indianola, in the county of Redwillow and State of Nebraska, have invented certain new and useful Improvements in Leverage-Power Mechanisms, of which the following is a specification.

This invention has for its object to provide an improved arrangement of lever mechanism whereby a minimum amount of manually-applied power can be readily converted into an accumulative force for driving light machinery; and the invention consists in the details of construction and peculiar combination of parts, all of which will hereinafter be fully described, and pointed out in the appended claims, reference being had to the accompanying drawings, in which—

Figure 1 is a side elevation of my improvements. Fig. 2 is a plan view of the front portion thereof. Fig. 3 is a transverse section taken on the line 3 3 of Fig. 1, and Fig. 4 is a perspective view illustrating the peculiar correlation of the several lever members in detail.

In the accompanying drawings, 1 indicates a suitable supporting-frame, comprising the side bars $1^a$, the cross-bars $1^b$, and the supporting-legs $1^c$.
2 2 designate standards projected up from the bars $1^a$ near the front end, in which is journaled a crank-shaft 3, having a central crank member $3^a$, and its ends are projected laterally beyond the standards 2 2, as clearly shown in Fig. 2, by reference to which it will be noticed that on one end of the shaft 3 is mounted a drive-pulley 4, which in practice may be belted with a drive-shaft (not shown) of the machine or machines to be driven.
Upon the shaft 3, preferably adjacent the pulley 4, is mounted an adjustable weight 5 to increase or decrease the centrifugal force of the shaft 3, and to further increase the said force the shaft 3 is equipped with a fly-wheel 6, having a poise $6^a$, and may be further equipped by a fixed weight 7, that is keyed to the shaft 3, as shown in Fig. 2. I desire it to be understood that while I prefer in the practical construction of my machine to use the adjustable weights and the weights $6^a$ and 7 yet one or all of the said weights may be omitted without departing from my invention, which in its more essential features lies in the peculiar correlation of several lever members for increasing leverage power, the construction of which and the coöperation with the crank-shaft I shall now proceed to describe.

Projected up about centrally from the bars $1^a$ is a pair of standards 8, in which are held three cross-bars or shafts 9, 10, and 11, as best shown in Fig. 3.

12 designates the manually-operated lever-bar, fulcrumed near its forward end on the cross-bar 11, its front end forming a short leverage member $12^a$, and its rear end projects beyond the rear end of the frame 1 and terminates in a handle $12^b$. The forward end of the bar 12 is bifurcated, and pivotally hung on the extreme front end of the part $12^a$ is a U-shaped link-bar 13. 15 designates another horizontally-disposed U-shaped link-bar, the free ends $15^a$ of which straddle the lower end of the bar 13 and are adjustably connected with the said bar 13 by the cross-bolt 14, that passes through the lower end of bar 13 and through any one set of a series of apertures $15^b$ in the ends $15^a$ of the bar 15.

16 indicates a link member pivotally hung from the bifurcated end of the bar 12 and having its fulcrum at a point to the rear of the standards 8 and at a distance equal that which the fulcrum-point of bar 13 is in advance of the said standards 8.

The lower end of the member 16 is pivotally connected to the rear end of an adjustable weight-bar 17, said rear end being bifurcated, as clearly shown in Fig. 4. The shank portion $17^a$ of the member 17 passes through the U-shaped member 13 and the standards 8 and has a series of apertures $17^b$ for adjustably pivoting the shank $17^a$ on the cross-bar 10, (see Figs. 3 and 4,) the purpose of which is to set the counterpoise or weighted member 17 to increase or diminish the balance of the said member 17, the function of which is to counterbalance the lever 12 and reduce the lifting force transmitted to it from the crank-shaft and the bar 15 practically to *nil*, requiring, as it were, only so much force from the crank-shaft as is necessary to lift the member 15, and which force may be materially decreased by making the free end of the member 17 sufficiently heavy and setting its fulcrum-point so that it (the member 17) will counterbalance the members 12, 13, and 15. To further assist in reducing the applied force necessary—that is, the force created by the momentum of the crank-shaft and its fly-wheel—a buffer-spring 20 is held in a socket 19, secured to the frame 1, (see Fig. 1,) which bears against a disk 21ª on the lower end of a dasher-rod 21, pivotally secured to the handle member, as shown.

From the foregoing description, taken in connection with the accompanying drawings, it is thought the advantages and complete operation of my invention will be readily apparent.

Ordinary manual force being applied to the lever 12 is materially multiplied by the correlation of the several link-bars and through them transmitted to the crank-shaft. The said power can be increased or diminished, as the character of the machine to be driven from the drive-shaft may make desirable, by adjusting the pivotal connections of the several link-bars, as hereinbefore explained.

The construction of my invention is simple and of such character that the same may be readily put up, as the several levers and connecting-bars can be made up by an ordinary blacksmith.

I am aware it is not new to provide in combination with a drive-shaft having a fly or momentum wheel or weight and a manually-operated lever intermediate link devices for increasing the leverage initially created by manual power, and I make no claim for such general combination; but What I do claim as new, and for which I desire Letters Patent, is—

The hereinbefore-described improvements in mechanical movements, comprising the following elements in combination; a supporting-frame, including the standards 2 and 8, the crank-shaft journaled on the standards 2, the weighted fly-wheel 6, the adjustable counterpoise 5, and the drive-pulley 4, mounted to turn with the crank-shaft, the lever 12, fulcrumed on the standards 8, with its forward end 12ª, projected beyond the fulcrum-point, the weighted member 17, adjustably fulcrumed on the standards 8, its front or weighted end swinging freely, the link 16, joining the rear end of the member 17, with the lever 12, the member 15, pivotally hung at one end of the standards 8, a link connection joining the other end of the said lever 15, with the crank-shaft, the member 13, hung pendently from the front end of lever 12, means for adjustably and pivotally connecting its lower end with the lever 15, the buffer-spring 20, the dasher member 21ª, and the rod 21, pivotally connected to the lever 12, all being arranged substantially as shown and for the purposes set forth.

AUGUST KREIDT.

Witnesses:
HARVEY BURGESS,
DELOS A. WATERMAN.